Sept. 22, 1936.  N. STATHAM  2,054,840
ADJUSTABLE ATTACHMENT FOR BELTS AND THE LIKE
Filed May 29, 1933  4 Sheets-Sheet 1
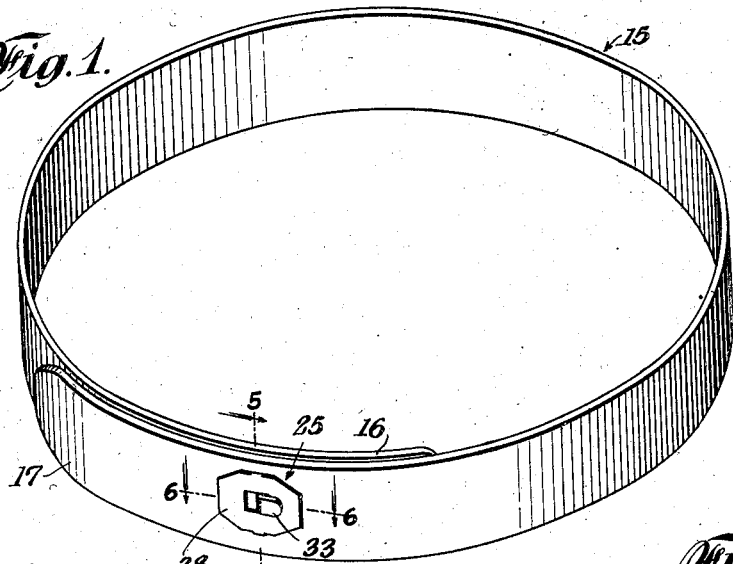
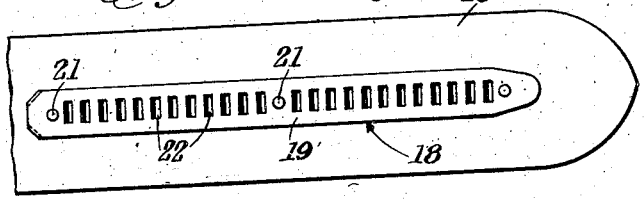
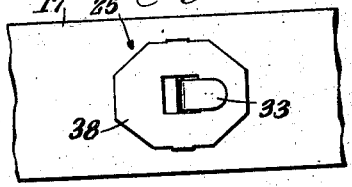
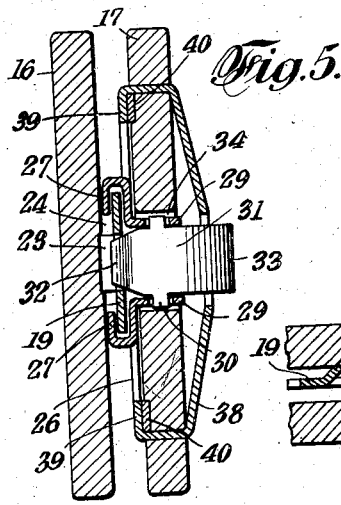
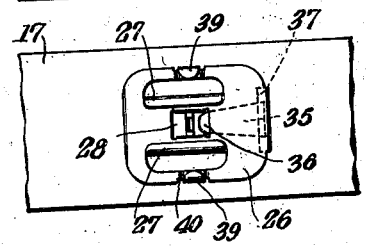
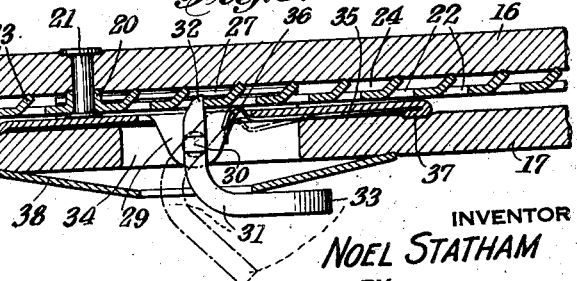
INVENTOR
NOEL STATHAM
BY
Evarts, Lemlein & Wolsky
his ATTORNEYS Sept. 22, 1936.   N. STATHAM   2,054,840
ADJUSTABLE ATTACHMENT FOR BELTS AND THE LIKE
Filed May 29, 1933   4 Sheets-Sheet 2
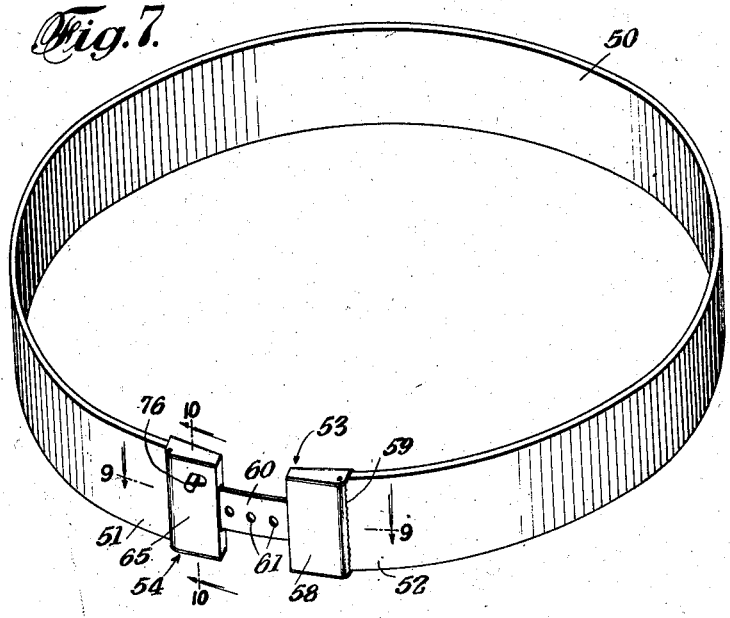
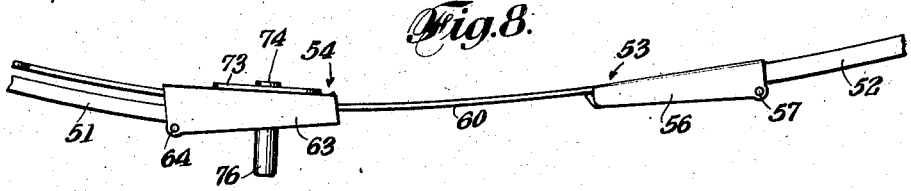
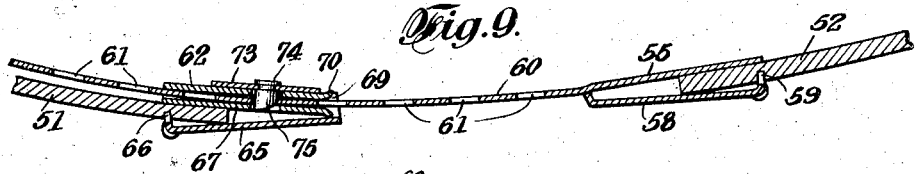
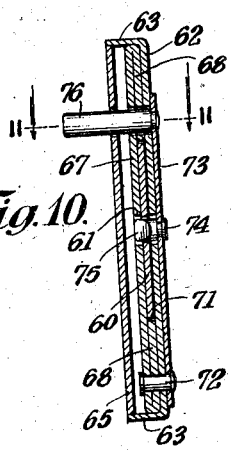
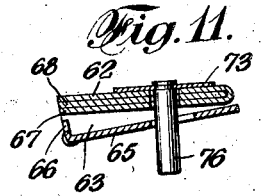
INVENTOR
NOEL STATHAM Sept. 22, 1936.  N. STATHAM  2,054,840
ADJUSTABLE ATTACHMENT FOR BELTS AND THE LIKE
Filed May 29, 1933  4 Sheets-Sheet 3
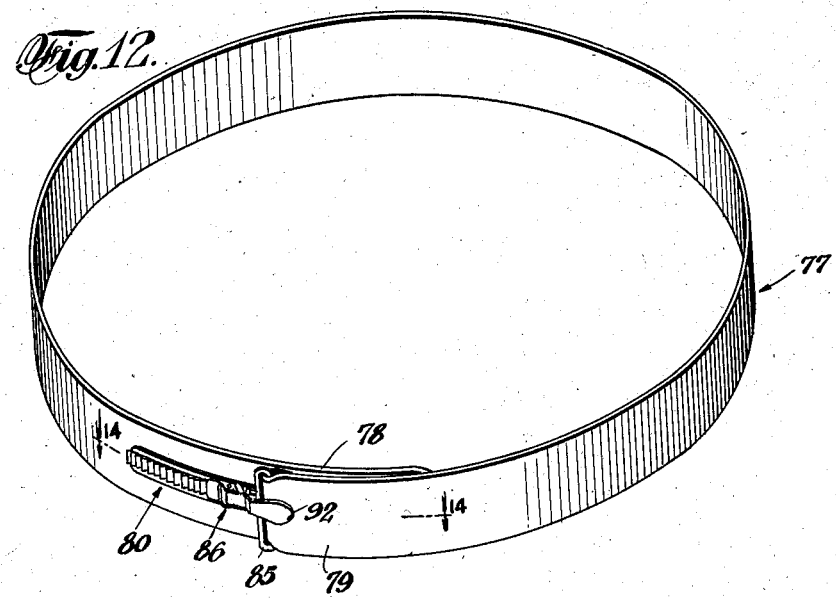
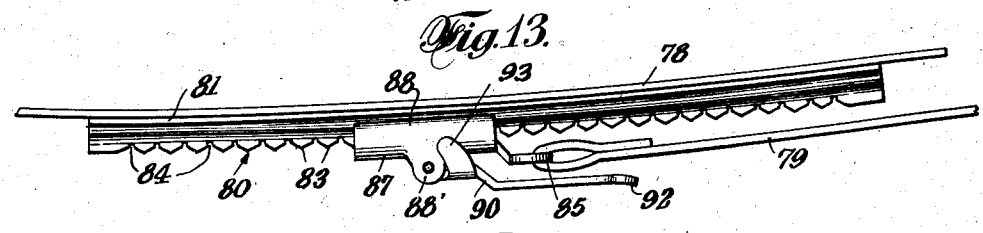
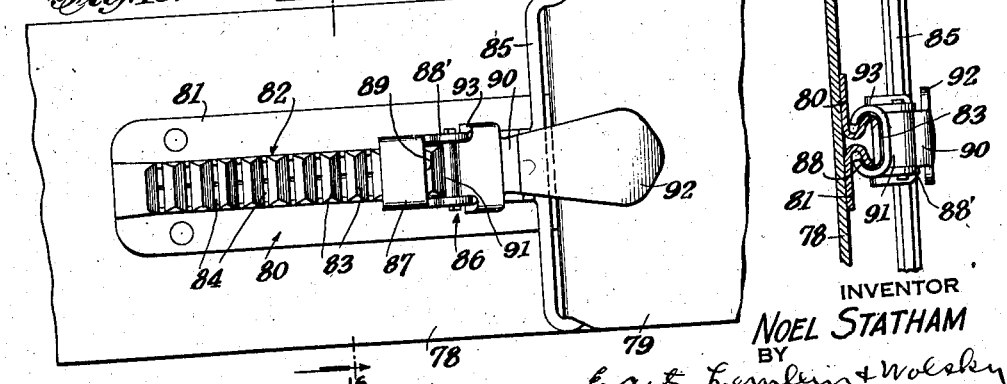
INVENTOR
NOEL STATHAM
BY
Craik, Kemlein & Wolsky
his ATTORNEYS Sept. 22, 1936.  N. STATHAM  2,054,840
ADJUSTABLE ATTACHMENT FOR BELTS AND THE LIKE
Filed May 29, 1933  4 Sheets-Sheet 4
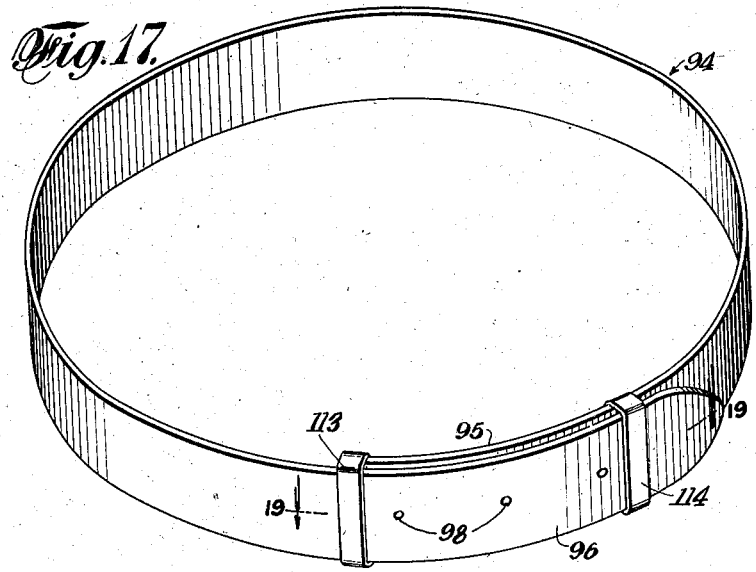
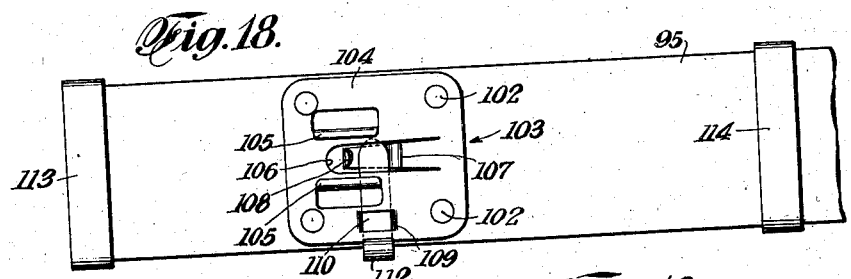
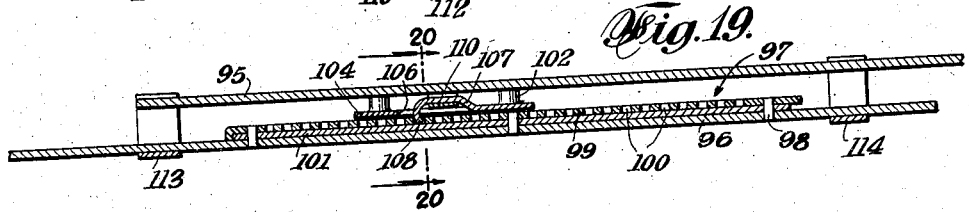
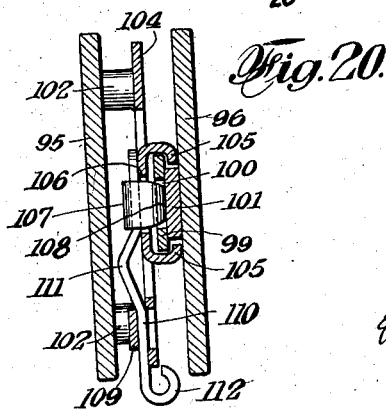
INVENTOR.
NOEL STATHAM Patented Sept. 22, 1936

2,054,840

UNITED STATES PATENT OFFICE 2,054,840

ADJUSTABLE ATTACHMENT FOR BELTS AND THE LIKE

Noel Statham, Irvington-upon-Hudson, N. Y.

Application May 29, 1933, Serial No. 673,353

8 Claims. (Cl. 24—206)

My present invention relates to adjustable supporting and fastening devices and more particularly to such as are adapted to vary or adjust the length of a number of articles of wearing apparel, such as belts, garters, suspenders and the like, although not necessarily restricted to these articles, and aims to devise devices of the general character specified which are simple in construction, and which are highly efficient and convenient for the use of fastening or adjusting the lengths of articles such as those above enumerated. Other objects and advantages of the devices of the present invention, particularly as exemplified in the following illustrative embodiments of the same, will in part be pointed out in detail hereinafter, and will in part, be obvious to those skilled in the art to which the present invention relates.

In the accompanying specification I shall describe, and in the annexed drawings show three illustrative embodiments of the present invention. It is, however, to be clearly understood, that my invention is not limited to the specific embodiments thereof herein shown and described for purposes of illustration only.

Referring to the drawings in which I have shown the aforesaid illustrative embodiments of the present invention:

Fig. 1 is a perspective view of a belt provided with a length varying or adjusting device made in accordance with one form of the present invention.

Fig. 2 is an enlarged fragmentary plan view of a portion of the belt to which is attached a resilient track member constituting a part of the first form of the present invention.

Fig. 3 is an enlarged fragmentary front elevational view of a portion of the belt bearing an adjusting portion constituting the remaining part of the first form of the present invention.

Fig. 4 is a view similar to Fig. 3 showing the rear of the same portion of the device.

Fig. 5 is an enlarged transverse sectional view taken along line 5—5 of Fig. 1.

Fig. 6 is an enlarged longitudinal sectional view taken along line 6—6 of Fig. 1.

Fig. 7 is a perspective view of a belt provided with the second form of the aforesaid illustrative embodiments of the present invention.

Fig. 8 is an enlarged edge view of the same.

Fig. 9 is an enlarged longitudinal sectional view taken along line 9—9 of Fig. 7.

Fig. 10 is an enlarged transverse sectional view taken along line 10—10 of Fig. 7.

Fig. 11 is a transverse sectional view taken along 11—11 of Fig. 10.

Fig. 12 is a perspective view of a belt provided with the third form of the aforesaid illustrative embodiment of the present invention.

Fig. 13 is an enlarged edge view of the same.

Fig. 14 is a fragmentary, enlarged, longitudinal sectional view taken along line 14—14 of Fig. 12.

Fig. 15 is a fragmentary, enlarged front elevational view of a portion of the belt shown in Fig. 12, provided with track and operating members of the present form of this invention;

Fig. 16 is a transverse sectional view taken along line 16—16 of Fig. 15.

Fig. 17 is a perspective view of a belt provided with the fourth form of the aforesaid illustrative embodiments of the present invention.

Fig. 18 is an enlarged view of the same.

Fig. 19 is an enlarged longitudinal sectional view, taken along line 19—19 of Fig. 17; and Fig. 20 is a transverse sectional view taken along line 20—20 of Fig. 19.

Referring now more in detail to the aforesaid illustrative embodiments of the present invention and with particular reference Figs. 1 to 6 inclusive showing the first form thereof, the numeral 15 generally designates a belt or similar article such as mentioned in the earlier portions of this specification, such belt having what might be termed an interior end portion 16 and an exterior end portion 17. The outer surface of the interior end portion 16 is provided with a track member generally designated by reference character 18, such track member comprising a resilient metal strip 19 having at the ends and at the center thereof posts 20 punched therethrough and by means of which, in association with rivets 21, the track member 18 is secured to the interior end portion 16 of the belt. The strip 19 is further provided with a series of equi-distantly spaced transverse slots 22 the purpose of which will become apparent as the detailed description progresses. These slots are formed by shearing the metal and punching the tabs 23 rearwardly in the direction of the posts 20 all as very clearly shown in Fig. 6 of the drawings. The posts 20 and tabs 23 rest against the exterior surface of the interior end portion 16 of the belt so as to maintain the track member 18 spaced away from the belt, the space being designated by the numeral 24 the purpose of which will likewise become apparent as this description progresses.

I shall now describe the adjusting member cooperable with the track member 18 for the purpose of varying or adjusting the length of the belt 15. Such adjusting member is generally designated by reference character 25 and comprises a plate 26 adapted to be secured, in a manner hereinafter stated, to the interior surface of the exterior end portion 17 of the belt. Such plate is provided with oppositely disposed channel guides 27 which are formed by shearing the plate 26, punching the metal so sheared and thereafter forming the same into the channels clearly illustrated in Fig. 5 of the drawings. The plate 26 is additionally sheared and the metal sheared, punched out so as to present a central opening 28, the metal thus punched out presenting ears 29 extending in the direction opposite to that in which the channel guides 27 extend. Pivotally mounted intermediate the ears 29, as at 30, is a ratchet member 31 having the interior slot-engaging bevelled end 32 and the exterior operating end 33, the ears 29 and the ratchet member 31 carried thereby extending upwardly through an opening 34 in the exterior end portion 17 of the belt. In order to maintain the ratchet member 31 in a normal operating position, as indicated in full lines in Fig. 6 of the drawings, I provide a flat spring 35 the upwardly bent end 36 of which is adapted, as will later be apparent, to always return the ratchet member 31 to its normal operating position, the spring being carried by the plate 26 and being secured thereto as by having a tongue 37 formed integrally with the plate and bent back upon the plate so as to pinch the spring in a fixed position.

The device is completed by an outer plate or escutcheon 38 adapted to be secured to the exterior surface of the exterior end portion 17 of the belt, in substantial alignment with the plate 26 by means of tabs 39 extending through the exterior end portion of the belt and engaging over offset or depressed portions 40 formed in the plate 26.

This completes the description of the first form of the devices of the present invention. It is believed that the mode of operation will be obvious from the foregoing description but for the sake of clarity, the same may be briefly summarized as follows: After the track member 18 and operating portion 25 of the devices of the present invention are fixed in place as heretofore described, the belt or other article provided with such devices is ready for use. The belt is engaged about the body of the wearer in a conventional manner and the exterior end portion 17 is slid over the interior end portion 16 in such manner as to cause the engagement of the channel guides 27 with the track member 18. As the belt is drawn tighter, the interior bevelled end 32 of the spring pressed ratchet 31 is adapted to freely slide over the slots 22 of the strip 19 and the tightening is continued until the proper amount of slack has been taken up. As soon as the sliding movement is discontinued, the spring 35 causes the slot-engaging bevelled end 32 of the ratchet 31 to engage in the nearest adjacent slot 22 of the strip 19. In view of this engagement it will now be impossible for the exterior end portion 17 of the belt to slide over the interior end portion 16 of the belt in the direction opposite to that in which it was previously moved, in other words, loosen, thus effectively locking the belt in its adjusted position. If it is desired to open the belt, the operator pivots the ratchet 31 by means of the operating portion 33 to move the slot-engaging end 32 of the ratchet out of the slot 22 with which it was engaged, this action being against the urge of the spring 35, and thus the entire operating portion 25 of the devices of the present invention will be movable in the direction opposite to that in which it was previously moved to free the exterior end portion 17 of the belt from the interior end portion thereof.

This completes the description of the mode of operation of the first form of the devices of the present invention and I shall now describe the second of the aforesaid illustrative embodiments of the present invention.

Referring now more in detail to the second of the aforesaid illustrative embodiments of the present invention and with particular reference to Figs. 7 to 11 inclusive of the drawings, the numeral 50 generally designates a belt having the opposed end portions 51 and 52. The end portion 52 is provided with what might be termed a catch portion 53 and the end 51 is provided with what might be termed a keeper portion 54. The catch portion 53 consists of a rear plate 55 having the end portions 56 thereof bent upwardly at right angles and between which there is pivotally mounted as at 57 a front plate 58 the rear edge of which is bent downwardly at right angles and provided with teeth 59 adapted to bite into the end portion 52 of the belt 50 all as clearly shown in Fig. 9 of the drawings. Constituting an extension of the plate 55 is a resilient strip 60 the width of which is considerably less than that of the plate 55 such strip being provided with a line of apertures 61.

The keeper portion 54 consists of a plate 62 the side edges 63 of which are bent upwardly at right angles and are adapted to pivotally support therebetween, as at 64, another plate 65 the rear edge of which is bent downwardly at right angles and provided with teeth 66 adapted to bite into the end portion 51 of the belt 50, the mode of fastening the keeper portion 54 to the end 51 being similar to the mode of fastening the catch portion 53 to the end 52. The plate 62 is bent back upon itself so as to form the intermediate plate 67 and the side edges of the plate 67 are bent back upon themselves, as at 68, and, at the bend between the plates 62 and 67, I provide a slot 69 bounded by flared lips 70 so that the spaced plates 62 and 67 and the facing edges of the bent back portions 68 of the plate 67 present a passageway 71 receptive of the resilient metal strip 60 of the catch member 53.

Riveted, as at 72, to the keeper member 54 is a spring plate 73 provided with a locking projection 74 the upper end of which is bevelled as at 75, the locking projection extending through openings in the plates 62 and 67 and being adapted to cross, the path of the passageway 71. The free end of the spring 73 is provided with an operating member or post 76 adapted to extend through openings in the plates 62, 67 and 65 all as clearly shown in the Fig. 10 of the drawings.

This completes the description of the second form of the aforesaid illustrative embodiments of the devices of the present invention. It is believed that the mode of operation and use of the same is obvious to those skilled in the art to which the present invention relates, but for the purpose of clarity, the same may be briefly summarized as follows: After the keeper member 54 and the catch member 53 have been fastened, respectively, on the ends 51 and 52 of the belt 50, the belt is in condition to be used. It is applied about the wearer in the conventional manner and the resilient strip 60 is guided through the passageway 71 of the keeper member 54. In view of the bevelled end 75 on the locking projection 74, the strip 60 can slide freely through the passage 71 in the direction corresponding to the tightening of the belt but as soon as the tightening process is discontinued, the locking projection 74 is urged by the spring plate 73 into engagement with the nearest opening 61 of the strip 60. The whole is therefore locked securely in place. When it is desired to open the belt the operating post 76 is depressed thus disengaging the locking post 74 from the opening 61 with which it was engaged and the resilient strip 60 may be withdrawn from the passageway 71 of the keeper member 54. This completes the description of the mode of operation and use of the second form of the illustrative embodiments of the devices of the present invention.

I shall now describe the third form of the aforesaid illustrative embodiments of the present invention, the same being illustrated in Figs. 12 to 16 inclusive of the drawings.

In these figures, the numeral 77 generally designates a belt having an interior end portion 78, and an exterior end portion 79. Secured to the exterior surface of the interior end portion 78 of the belt 77 is a track member 80, such track member consisting of a resilient strip of metal 81 from which is integrally formed a central raised portion 82 constituting the track proper. Such central raised portion 82 is provided on its upper surface with a multiplicity of serrations 83, which are spaced from each other by transverse slots 84.

Secured to the exterior end portion 79 of the belt 77, as by means of the loop 85, is an operating member generally designated by reference character 86, such operating member being adapted in a manner herein more fully explained to cooperate with the track member 80 to adjust the effective length of the belt 77.

The operating member 86 consists of a plate 87, the side edges of which are channeled, as at 88, so as to embrace about the central raised portion 82 of the track member 80, such plate 87 also having struck up therefrom, on its outer surface, oppositely disposed ears 88', the punching out of such ears presenting an opening 89 in the plate. Pivotally mounted intermediate the ears 88' is a slot-engaging member 90, the inner end 91 of which is adapted to engage in the slots 84 of the track member 80 and the outer end 92 of which is adapted to be manipulated at the will of the wearer of the belt as will hereinafter become apparent. The slot-engaging member 90 is completed by rearwardly directed locking lugs 93 which are adapted when the member 90 is in one of its adjusted positions, to engage over and clamp the channel guides 88, as will be obvious to those skilled in the art to which the present invention relates.

This completes the description of the third of the aforesaid illustrative embodiments of the present invention. It is believed that the mode of operation and use of this form of the present invention will be obvious from the foregoing description, but for the sake of clarity the same may be briefly summarized as follows:

After the track member 80 and the operating member 86 have been fastened respectively on the ends 78 and 79 of the belt 77, the belt is in condition to be used. It is placed about the wearer in the conventional manner and the exterior end portion 79 is slid over the interior end portion 78 in such manner as to cause the engagement of the channel guides 88 with the central raised portion 82 of the track member 80. At this time, the operating end 92 of the slot-engaging member 90 is raised so as to maintain the end 91 of such member out of the path of the slots 84. The belt is drawn about the wearer and the desired amount of the slack is taken up; and as soon as the belt is as tight as the wearer desires, the operating end 92 of the member 90 is depressed so as to cause the slot-engaging end 91 to engage in the nearest adjacent slot 84 of the central raised portion 82 of the track member 80. In view of the clamping of the lugs 93 about the channel guides 88, the member 90 is secured in place and the operating member 86 cannot be moved in either direction over the track 80. When it is desired to loosen the belt, the operating end 92 of the member 90 is manipulated so as to release the lugs 93 from about the channel guides 88 and the end 91 from the slot 84 with which it was engaged, thus permitting the operating member 86 to be moved over the track 80. This completes the description of the mode of operation and use of the third form of the devices of the present invention.

I shall now describe the fourth form of the aforesaid illustrative embodiments of the present invention, the same being illustrated in Figs. 17 to 20 inclusive of the drawings.

In said figures numeral 94 generally designates a belt having the interior end portion 95 and the exterior end portion 96. Secured to the interior surface of the exterior end portion 96 is a track member 97, such track member being riveted to the end portion 96 as at 98 and consisting of a resilient strip of metal 99 provided with the multiplicity of separately spaced transverse slots 100. The track member 97 is maintained in spaced relation to the end portion 96 of the belt 94 by means of a strip 101 of leather or any other suitable material, this strip being narrower than the track member so as to permit the side edges of the track member to extend beyond the side edges of the strip for a purpose which will later be more clearly understood.

Secured to the exterior surface of the interior end portion 95 of the belt 94, as by means of rivets 102 is an operating member generally designated by reference character 103, such operating member being adapted, in a manner hereinafter more fully explained, to cooperate with the track member 97 to adjust the effective length of the belt 94.

The operating member 103 consists of a plate 104 having sheared and struck up therefrom channel guides 105 adapted to embrace the free edges of the track member 97, the member 103 further being sheared to present an opening 106, the metal so sheared from the plate comprising a tongue 107, the free end 108 of which is bent, as clearly shown in Fig. 19 of the drawings in such manner as to be engageable in any one of the slots 100 of the track member 97, the end 108 being bent in such manner that the operating member 103 is free to move over the track member 97 in one direction but being unable to move in the opposite direction unless the end 108 is disengaged from the slot 100 of the track member 97 with which it had previously been engaged. The plate 104 is further sheared and the metal sheared is struck up so as to provide a guide 109 between which guide and the body of the plate 104 there is adapted to slide a cam member 110 having a cam surface 111, the arrangement being such that sliding the cam member 110 by applying pressure to the curved end 112 thereof will bring the cam surface 111 into contact with the tongue 107 so as to move the same away from the plate 104 thus moving the end 108 of such tongue out of the path of the track member 97.

The present illustrative embodiment of the present invention is completed by a pair of keeper members 113 and 114 carried by the interior end portion 95 of the belt 94. This completes the description of the fourth form of the aforesaid illustrative embodiments of the present invention. It is believed that the mode of operation and use of this form of the present invention is obvious to those skilled in the art to which the present invention relates, but for the purpose of clarity, the same may be briefly summarized as follows:

After the track member 97 and the operating member 103 have been adjusted respectively on the ends 96 and 95 of the belt 94, the belt is in condition to be used. It is positioned about the wearer in the conventional manner and the exterior end portion 96 is slid over the interior end portion 95, through the keepers 113 and 114 in such manner as to cause the channel guides 105 of the operating member 103 to embrace the free edges of the track member 97, extending beyond the central leather strip 101. The belt is drawn about the wearer and the desired amount of the slack is taken up, the shape of the end 108 of the tongue 107 is being such as previously indicated, as to permit the operating member 103 to freely move over the track member 97 in the direction of the taking up of the slack. As soon as the belt is as tight as the wearer desires, the end 108 of the tongue 107 will in view of the resilient character of the tongue 107 engage in the nearest adjacent slot 100 of the strip 99, thus locking the belt in place and preventing the same from loosening. When it is desired to loosen the belt, pressure is applied to the end 112 of the cam member 110 to slide the same upwardly, thus bringing about an engagement of the cam surface 111 with the tongue 107 to raise the latter away from the body portion of the plate 104. Such movement also moves the end 108 of the tongue 107 out of engagement with the slot 100 of the strip 99 with which it had previously been engaged and in so doing permits the operating member 103 to be moved over the track member 97 in the direction opposite to that in which it was moved during the taking up of the slack. This completes the description of the mode of operation and use of the fourth form of the devices of the present invention.

This likewise completes the description of all of the aforesaid illustrative embodiments of the devices of the present invention and their modes of operation and use. It will be obvious from such description that the devices of the present invention are characterized by their wide range of applicability and their uniformity in construction, assembly and operation. Other superiorities of the devices of the present invention in construction, mode of assembly and use will readily occur to those skilled in the art to which the present invention relates.

What I claim as my invention is:

1. An adjustable fastening device comprising a pair of cooperating members, one of said members consisting of a track and the other of said members consisting of a pair of plates one of which carries a pivotally mounted engaging member having a bevelled end portion engaged with said track to permit relative movement between said cooperating members in one direction only and an operating end portion extending through the other of said plates for manipulation of said engaging member to permit free relative movement between said cooperating members.

2. An adjustable fastening device comprising a pair of cooperating members, one of said members consisting of a track having a multiplicity of separately spaced slots and the other of said members consisting of a pair of plates one of which carries a pivotally mounted engaging member having a bevelled end portion engaged with the slots of said track to permit relative movement between said cooperating members in one direction only and an operating end portion extending through the other of said plates for manipulation of said engaging member to permit free relative movement between said cooperating members.

3. An adjustable fastening device comprising a pair of cooperating members, one of said members consisting of a track and the other of said members consisting of a pair of plates one of which is provided with channel guides slidable over said track and carries a pivotally mounted engaging member having a bevelled end portion engaged with said track to permit relative movement between said cooperating members in one direction only and an operating end portion extending through the other of said plates for manipulation of said engaging member to permit free relative movement between said cooperating members.

4. An adjustable fastening device comprising a pair of cooperating members, one of said members consisting of a track having a multiplicity of separately spaced slots and the other of said members consisting of a pair of plates one of which is provided with channel guides slidable over said track and carries a pivotally mounted engaging member having a bevelled end portion engaged with the slots of said track to permit relative movement between said cooperating members in one direction only and an operating end portion extending through the other of said plates for manipulation of said engaging member to permit free relative movement between said cooperating members.

5. An adjustable fastening device comprising a pair of cooperating members, one of said members consisting of a track and the other of said members consisting of a pair of plates one of which carries a pivotally mounted engaging member having a bevelled end portion engaged with said track to permit relative movement between said cooperating members in one direction only and an operating end portion extending through the other of said plates for manipulation of said engaging member to permit free relative movement between said cooperating members, said second plate being provided with an opening receptive of said operating end portion and being further provided with lugs for securing said plate to said first plate.

6. An adjustable fastening device comprising a pair of cooperating members, one of said members consisting of a track having a multiplicity of separately spaced slots and the other of said members consisting of a pair of plates one of which carries a pivotally mounted engaging member having a bevelled end portion engaged with the slots of said track to permit relative movement between said cooperating members in one direction only and an operating end portion extending through the other of said plates for manipulation of said engaging member to permit free relative movement between said cooperating members, said second plate being provided with an opening receptive of said operating end portion and being further provided with lugs for securing said plate to said first plate.

7. An adjustable fastening device comprising a pair of cooperating members, one of said members consisting of a track and the other of said members consisting of a pair of plates one of which is provided with channel guides slidable over said track and carries a pivotally mounted engaging member having a bevelled end portion engaged with said track to permit relative movement between said cooperating members in one direction only and an operating end portion extending through the other of said plates for manipulation of said engaging member to permit free relative movement between said cooperating members, said second plate being provided with an opening receptive of said operating end portion and being further provided with lugs for securing said plate to said first plate.

8. An adjustable fastening device comprising a pair of cooperating members, one of said members consisting of a track having a multiplicity of separately spaced slots and the other of said members consisting of a pair of plates one of which is provided with channel guides slidable over said track and carries a pivotally mounted engaging member having a bevelled end portion engaged with the slots of said track to permit relative movement between said cooperating members in one direction only and an operating end portion extending through the other of said engaging members to permit free relative movement between said cooperating members, said second plate being provided with an opening receptive of said operating end portion and being further provided with lugs for securing said plate to said first plate.

NOEL STATHAM.